C. MELTZ.
MILK STRAINER.
APPLICATION FILED MAY 17, 1915.
1,168,532.
Patented Jan. 18, 1916.
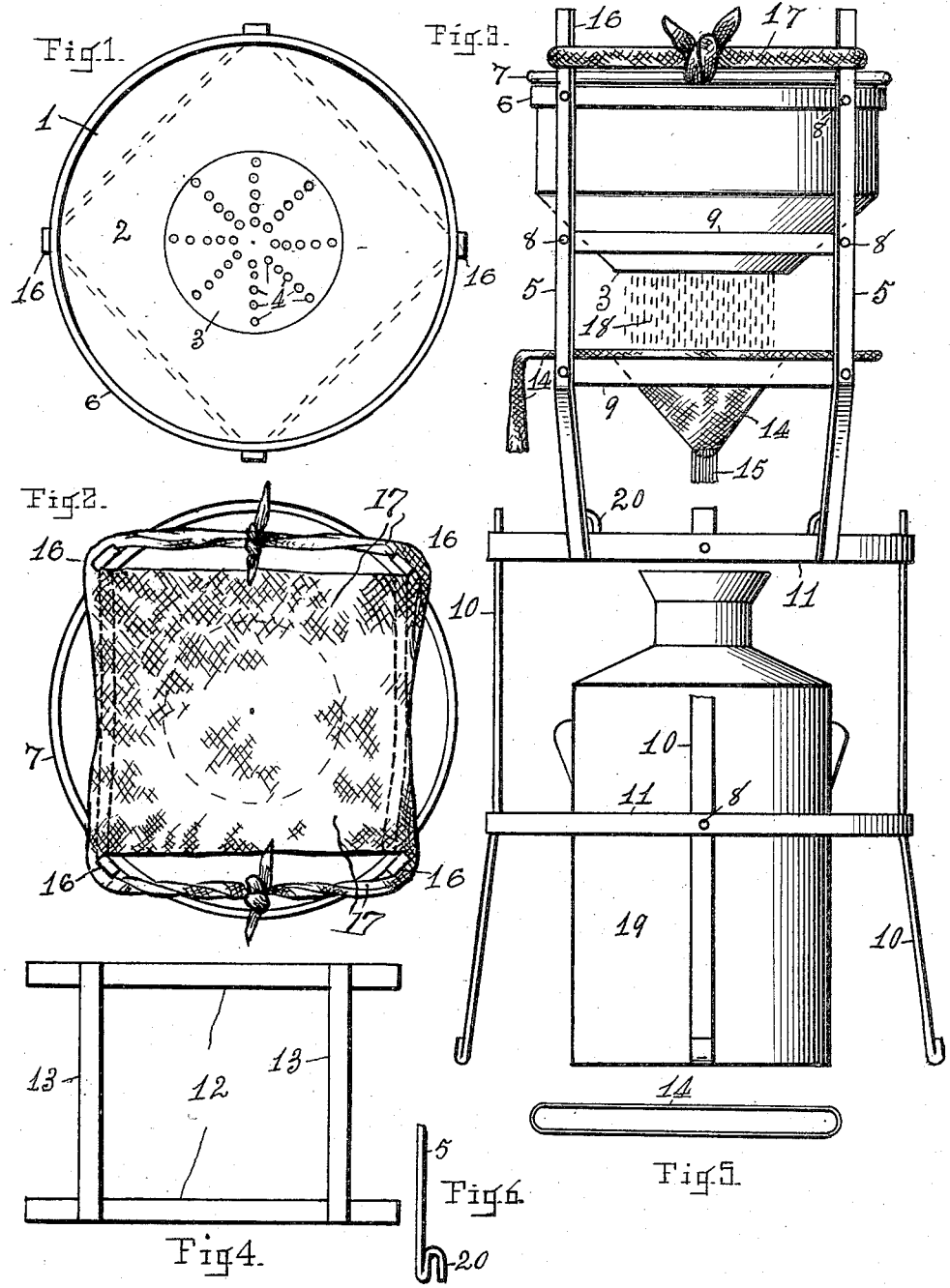
INVENTOR.
Christian Meltz.
BY
G. H. Albee,
ATTORNEY.

UNITED STATES PATENT OFFICE.

CHRISTIAN MELTZ, OF ALLENVILLE, WISCONSIN.

MILK-STRAINER.

1,168,532.  Specification of Letters Patent.  Patented Jan. 18, 1916.

Application filed May 17, 1915. Serial No. 28,607.

*To all whom it may concern:*

Be it known that I, CHRISTIAN MELTZ, a citizen of the United States, residing at Allenville, in the county of Winnebago and State of Wisconsin, have invented a new and useful Milk-Strainer, of which the following is a specification.

My invention relates to a device for straining milk as it is poured from a pail into the milk can in which it is shipped to the creamery, cheese factory, or city distributer, and it consists of a stand in which a pan is supported, the pan having a dishing bottom with a centrally arranged flat circular center, perforated with a plurality of fine holes. The pan is supported upon the stand at such a height that the milk can run from the strainer into the milk cans. Across the top of the pan a cloth strainer is secured which may depend into the pan and rest upon its bottom. At a short distance below the bottom of said pan, a second cloth strainer is arranged and is supported upon the girts of the stand. This receives the milk as it falls from the pan and strains it into the milk can. The strainers are so made that there will be at the least three thicknesses of cloth and may be any desired number more than that. This stand is so made that its feet can rest upon the upper end of a standard size of milk can, or upon a somewhat similar stand within which any size of milk can can be placed for receiving the milk as it is strained.

The invention is shown in the accompanying drawing in which—

Figure 1 is a plan of the pan top within the legs of the stand, and showing the pan bottom. Fig. 2 is a plan of the pan top within the leg tops, the legs being turned ⅛ around from those in Fig. 1, with a cloth strainer secured around the leg tops across the pan. Fig. 3 is a side elevation of a stand upon which the pan is supported, with a strainer cloth secured in position above the pan, the second strainer cloth arranged across the stand below the pan for straining the milk into the milk can, a milk can, and outside of the milk can, a second stand upon which the first one is supported, the legs of the upper stand being positioned as in Fig. 2. Fig. 4 is a plan of a frame over which the second strainer is secured. Fig. 5 is an end view of the second named strainer cloth. Fig. 6 is an edge view of one of the feet of the legs.

Similar numerals indicate like parts in the several views.

1, indicates the top of the pan; 2, its inclined bottom. Fig. 3 shows a vertical rim around the pan, which although not a necessity, is well to use; 3, its circular and flat bottom; 4, perforations of approximately $\frac{1}{16}$ of an inch in diameter, through the central part of the bottom; 5, legs of the upper stand; 6, a ring around the stand near the upper ends of the legs upon which the wire rim 7, of the pan rests; 8, rivets for securing the ring to the legs. The ring and legs may be made of $\frac{1}{8} \times 1\frac{1}{8}$ in. galvanized band metal secured to each other with rivets in a well known manner.

9, are connecting girts below the ring 6, spaced from the ring, from each other and from the lower ends of the legs. The girts or stretchers 9 are preferably straight from one leg to the other as is shown in dotted lines in Fig. 1.

10, are legs of the lower stand. This lower stand is made in a manner similar to the upper stand and its purpose is to support the upper stand. If the milk cans are all of one diameter in one establishment, the upper stand may be made to be supported upon the upper ends of the cans, by means of its feet 20, but when they are of various diameters, the lower stand is brought into use, cans of any diameter then being placed within the rings 11, said rings connecting the legs together.

12, indicates side pieces of a skeleton frame for a strainer; 13, cross pieces for said frame, over which the lower strainer cloth 14, is placed said strainer being of a pillow case type, it having two edges sewed together lengthwise thereof, and is open at one or both ends as desired. It is to be placed upon the frame slack, so that it will sag in the center of the frame as is shown in Fig. 3.

The milk as it is poured into the pan will filter through the cloth of the upper strainer and fall through the holes 4 and drop to the strainer below it in numerous small streams 18, which streams being exposed to the air in falling become cooled. When the milk falls from the upper into the lower strainer it causes the cloth to sag and the milk will fall from it in a single stream so that it will enter a small mouthed can as in Fig. 3, at 15. 16, indicates the upper ends of the legs 5 and should extend two or three inches above the ring 6 for providing a fastening means for the strainer cloth 17, said cloth being secured by tying as in Figs. 2 and 3, or otherwise. The cloth 14 may be secured upon the frame for it in a similar manner. The strainer upon the skeleton frame is placed across the girts 9, but is not fastened thereto. This strainer may be applied in various ways across the pan top, one of which is shown in Fig. 2. A rectangular piece of cloth 17, is taken and is torn or cut inward from its right and left hand side edges about midway its length, to $a$, leaving a piece 22, a little wider than the pan top which is spread across the pan. These two torn ends with the adjoining corners of the cloth are then brought around the ends 16 of the legs and tied into knots 23. No particular method of securing the cloth around the leg tops and across the pan is claimed, as it can be secured in various ways.

19, is a milk can and 20, feet upon the legs 5 for hooking over the ring 11 of the lower stand.

Having described my invention, what I claim and desire to secure by Letters Patent, is,—

1. A milk strainer comprising a stand having a plurality of legs and connecting girts which are adapted to support a milk pan and be arranged above a milk can, a pan arranged near the upper end of the stand having a bottom inclined downward and inward toward its center, a series of perforations through its bottom around its center, a cloth strainer secured in position across the pan and permitted to sag toward its bottom and to receive milk and strain the same, a skeleton frame consisting of two side strips and two cross strips connected to the side strips with an open space inside of the four strips, and adapted to be supported upon the girts of the stand, a strainer cloth of a pillow slip or bag type inclosing said frame and permitted to sag through and below said open space, and being adapted to receive milk from the first named strainer and strain the same into a milk can.

2. A milk strainer comprising a stand having connecting girts, a pan supported upon the stand having a bottom inclined downward and inward toward its center, a series of perforations through the bottom around its center, a cloth strainer secured across the pan and permitted to sag toward its bottom and to receive milk and strain the same, a skeleton frame consisting of two side strips and two cross strips connected to the side strips with an open space inside of the four strips arranged flatwise and being supported upon the girts of the stand, a cloth strainer around said skeleton frame adapted to sag downward through said open space and to receive milk from the first named strainer and conduct it into a milk can arranged in position below the strainers.

3. In a milk strainer having a pan with a perforated bottom and a cloth strainer arranged across the pan and depending into the same, a stand for supporting the pan having three or more legs and a ring secured to the legs a few inches below their upper ends and a plurality of stretchers between the legs, spaced from said ring, from each other and from the lower ends of the legs, one set of stretchers being arranged a suitable distance below the pan bottom for supporting a horizontally arranged skeleton strainer frame, and a hook upon the lower end of each leg adapted to hook over a similar ring as the upper ring of said stand.

4. In a milk strainer having a pan with a perforated bottom and a cloth strainer arranged across the pan and depending into the same and a stand for supporting the pan and a second strainer, supported upon said stand a second stand having three or more legs formed of band metal and connected to each other with a ring formed of similar band metal and secured thereto near their upper ends and adapted to support the legs of the first named stand, and a second ring secured to the legs intermediate the upper ring and lower ends of the legs.

5. In a milk strainer comprising a pan having a perforated bottom and a cloth strainer arranged across the pan and depending into the pan and a stand for supporting the pan, a second strainer consisting of a skeleton frame formed of two side pieces and two cross pieces connected to said side pieces with an open space inside of said four pieces, a cloth strainer of a pillow slip or bag construction type inclosing said frame and arranged in position thereon and adapted to be supported upon the stand for receiving milk as it falls from the pan and strain the same into a milk can.

CHRISTIAN MELTZ.

Witnesses:
C. M. Albee,
H. F. Quade.